(12) United States Patent
Huang

(10) Patent No.: US 11,443,546 B1
(45) Date of Patent: Sep. 13, 2022

(54) FINGERPRINT SENSING SIGNAL CORRECTION METHOD AND DEVICE THEREOF

(71) Applicant: NOVATEK Microelectronics Corp., Hsinchu (TW)

(72) Inventor: Min Huang, Taoyuan (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 17/233,570

(22) Filed: Apr. 19, 2021

(51) Int. Cl.
*G06V 40/13* (2022.01)
*G06F 21/32* (2013.01)
*G06V 40/12* (2022.01)
*G06F 3/041* (2006.01)

(52) U.S. Cl.
CPC ...... *G06V 40/1318* (2022.01); *G06F 3/04184* (2019.05); *G06F 21/32* (2013.01); *G06V 40/1365* (2022.01)

(58) Field of Classification Search
None
See application file for complete search history.

(56) References Cited

U.S. PATENT DOCUMENTS

| 2011/0012879 A1* | 1/2011 | Uehata | G09G 3/3614 345/207 |
| 2020/0065555 A1* | 2/2020 | Zhou | G06T 5/002 |
| 2020/0334435 A1* | 10/2020 | Hung | G06K 9/40 |

* cited by examiner

*Primary Examiner* — Joseph R Haley
(74) *Attorney, Agent, or Firm* — CKC & Partners Co., LLC

(57) ABSTRACT

A fingerprint sensing signal correction method for a fingerprint sensing signal correction device including a plurality of fingerprint sensors integrated inside of a display panel of an electronic device is disclosed. The method includes obtaining a plurality of environmental voltages of the display panel during a pre-scanning mode; generating a plurality of correction voltages associated with the plurality of environmental voltages during a signal processing mode; and canceling the plurality of environmental voltages from a plurality of amplified sensing voltages to generate a plurality of corrected sensing voltages during a normal mode.

13 Claims, 8 Drawing Sheets

4

Obtain environmental voltages of display panel during pre-scanning mode — 41

Generate correction voltages associated with environmental voltages during signal processing mode — 42

Cancel environmental voltages from amplified sensing voltages to generate corrected sensing voltages during normal mode — 43

Convert corrected sensing voltages into digital codes during normal mode — 44

FINGERPRINT SENSING SIGNAL CORRECTION METHOD AND DEVICE THEREOF

BACKGROUND

Field of Disclosure

The present disclosure relates to a fingerprint sensing technology. More particularly, the present disclosure relates to a fingerprint sensing signal correction method and device thereof.

Description of Related Art

In a pixel on an LCD (liquid crystal display) panel, the amount of light that is transmitted from the backlight depends on the voltage applied to the pixel. However, applying the same voltage for a long period would damage the pixel. In order to prevent damage, LCD panels quickly alternate the voltage between positive and negative for each pixel, which is called "polarity inversion". Ideally, the rapid polarity inversion wouldn't be noticeable because every pixel has the same brightness no matter a positive or a negative voltage is applied. However, in practice, the pixel flickers during polarity inversion. In order to make flickering phenomenon less noticeable, pixels with positive and negative voltages are interleaved, which is called "line inversion".

For an optical fingerprint sensor that is integrated inside of the LCD panel (e.g., an in-display fingerprint sensor), an incident light generated by the LCD hits a human finger to produce a reflected light, and the reflected light is received by a light sensor (e.g., a circuit including a photodiode and several thin-film transistors) to convert the reflected light into a voltage signal. Then, an ND (analog-to-digital) converter converts the voltage signal into a digital signal and transmits the digital signal to a processor for further image processing.

Applicant notices that the voltage applied to the pixel of the LCD panel becomes an environmental voltage (i.e., background noise) to be sensed by the fingerprint sensor, and thus the voltage signal generated by the light sensors is superposed with the environmental voltage, which influences a performance of fingerprint recognition. In some cases, the superposed voltage signal causes the A/D converter into a saturated state when the environmental voltage is large enough to be outside of an operating range of the A/D converter.

Therefore, there is a need to provide a fingerprint sensing signal correction method and related fingerprint sensing signal correction device to eliminate the environmental voltage generated by the LCD panel.

SUMMARY

An aspect of the present disclosure is to provide a fingerprint sensing signal correction method for a fingerprint sensing signal correction device including a plurality of fingerprint sensors integrated inside of a display panel of an electronic device. The method includes obtaining a plurality of environmental voltages of the display panel during a pre-scanning mode; generating a plurality of correction voltages associated with the plurality of environmental voltages during a signal processing mode; and canceling the plurality of environmental voltages from a plurality of amplified sensing voltages to generate a plurality of corrected sensing voltages during a normal mode.

Another aspect of the present disclosure is to provide a fingerprint sensing signal correction device for an electronic device including a display panel and a fingerprint sensor integrated inside of the display panel. The fingerprint sensor is configured to generate a sensing voltage during a pre-scanning mode. The fingerprint sensing device includes a fingerprint sensor, an AFE (analog front-end) amplifier, an A/D (analog-to-digital) converter, a digital processor, a D/A (digital-to-analog) converter, and a subtractor. The AFE amplifier is coupled to the fingerprint sensor, and configured to amplify the sensing voltage by a gain to generate an environmental voltage of the display panel during the pre-scanning mode. The A/D converter is configured to convert the environmental voltage into an environmental code during the pre-scanning mode. The digital processor is coupled to the A/D converter, and configured to calculate an offset code according to the environmental code and data including a display zone and a column location corresponding to the environmental code during a signal processing mode. The D/A converter is coupled to the digital processor, and configured to convert the offset code into a correction voltage associated with the environmental voltage during a normal mode. The subtractor is coupled to the AFE amplifier, the A/D converter and the D/A converter, and configured to subtract the correction voltage from an amplified sensing voltage, so as to generate a corrected sensing voltage during the normal mode.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
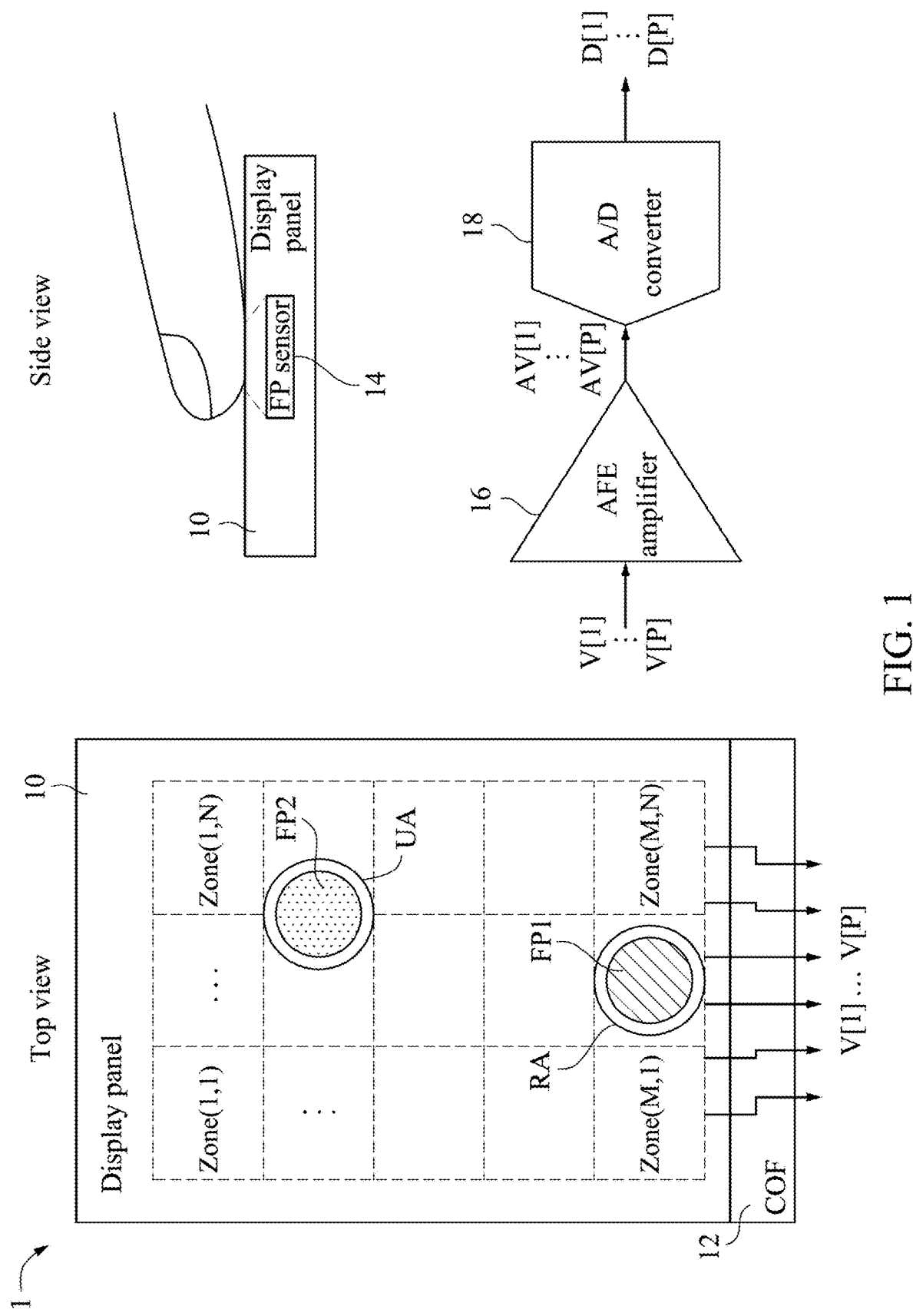
FIG. 1 is a schematic view of an electronic device.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic view of an electronic device 1. The electronic device 1 may be a smart phone including a fingerprint sensing signal read-out device, a film substrate 12, a display panel 10, and a plurality of FP (fingerprint) sensors 14 integrated inside of the display panel 10. The fingerprint sensing signal read-out device includes an AFE (analog front-end) amplifier 16 and an ND (analog-to-digital) converter 18. The display panel 10 may be an LCD (liquid crystal display) panel, and the film substrate 12 may be a COF (Chip-on-Film) substrate. For a large size display application, the display panel 10 is divided into M*N zones, where M and N are integers greater than zero, i.e., M, N>0. The plurality of FP sensors 14 are disposed inside of the display panel 10, and configured to generate a plurality of sensing voltages V[1]~V[P]. Given that each zone includes Q FP sensors 14, P=M*N*Q, where P and Q are integers greater than zero, i.e., P, Q>0. The film substrate 12 is coupled to the plurality of FP sensors 14 and the AFE amplifier 16, and configured to transmit the plurality of sensing voltages V[1]~V[P] to the AFE amplifier 16. The AFE amplifier 16 is coupled to the film substrate 12 and the A/D converter 18, and configured to amplify the plurality of sensing voltages V[1]~V[P] to generate a plurality of amplified sensing voltages AV[1]~AV[P] to the A/D converter 18. The A/D converter 18 is coupled to the AFE amplifier 16 and a processor (not shown in FIG. 1), and configured to convert the plurality of amplified sensing voltages AV[1]~AV[P] into a plurality of digital codes D[1]~D[P] to the processor for further data processing, e.g., fingerprint recognition and user authentication.

For large display panel applications, a sensing area RA for registration and a sensing area UA for authentication may be different. That is to say, a user may touch the sensing area RA for registration to register his or her fingerprint FP1, and the user may touch the sensing area UA for authentication to input his or her fingerprint FP2. The plurality of FP sensors 14 are uniformly distributed over a visible range of the display panel 10, however, due to polarity inversion (e.g., line inversion) to liquid crystal pixels of the display panel 10, environmental voltages of the plurality of FP sensors 14 are not uniformly distributed. In a case that the sensing areas RA and UA are different, there is a difficulty for the electronic device 1 to match the inputted fingerprint FP2 with the registered fingerprint FP1.

Figure 2:
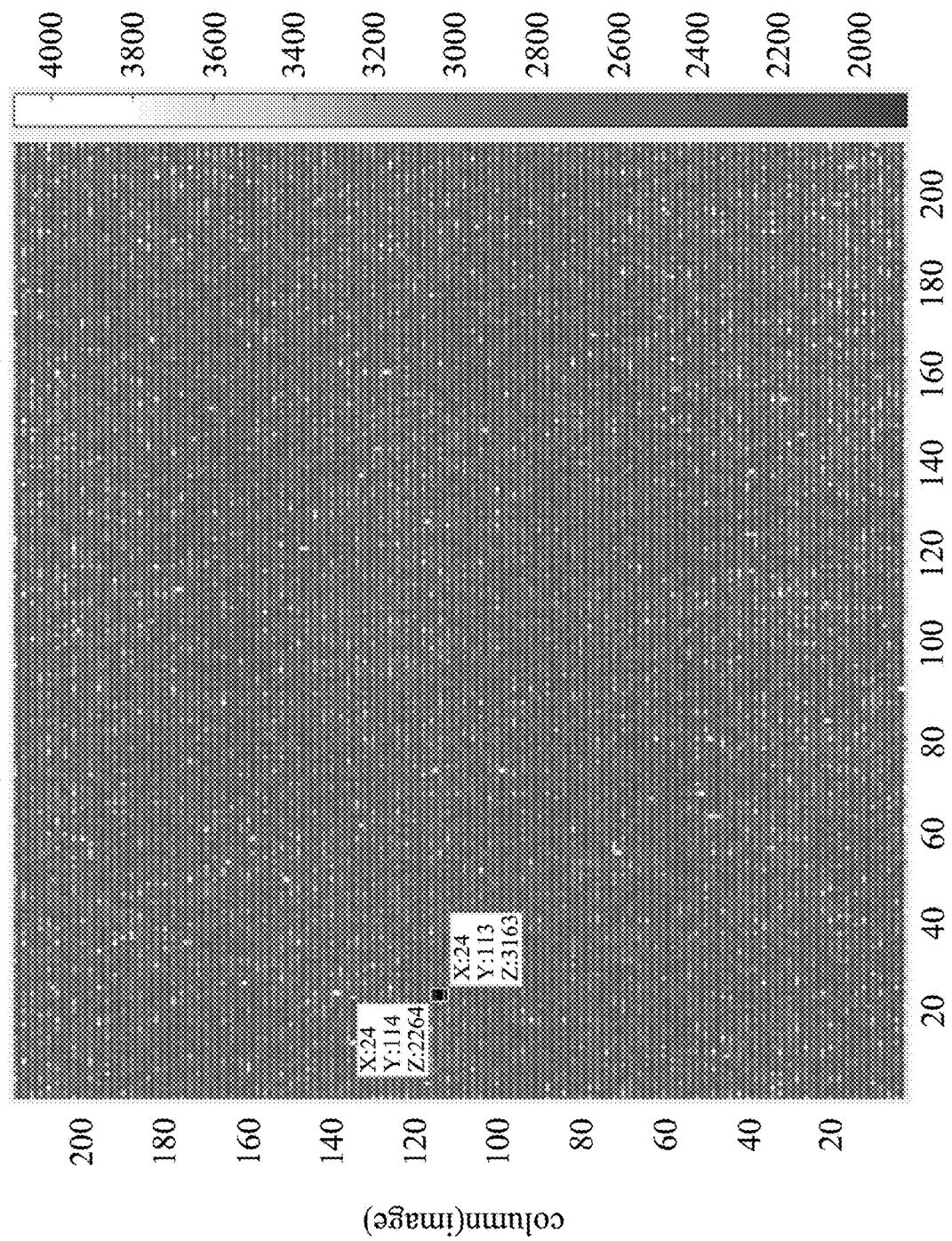
FIG. 2 is a schematic view of an averaged voltage distribution of the display panel in FIG. 1 according to an embodiment of the present disclosure.

FIG. 2 is a schematic view of an averaged voltage distribution of the display panel 10 according to an embodiment of the present disclosure. Given that the A/D converter 18 is a 12-bit A/D converter having a full conversion range of code 0 to code 4095 with decimal representation. FIG. 2 shows that an averaged environmental voltage of 113-th odd-column corresponding to 24-th row is converted into code 3163, e.g., (row, column, averaged voltage)=(X, Y, Z)=(24, 114, 3163); and an averaged environmental voltage of 114-th even-column corresponding to 24-th row is converted into code 2264, e.g., (X, Y, Z)=(24, 113, 2264); where a difference between the 113-th odd-column and 114-th even-column is 899 coding units (which is 899/4096=21.9% of a full range of the 12-bit A/D converter). Typically, a magnitude of a fingerprint sensing signal is smaller than 100 coding units. In some cases, some of the plurality of amplified sensing voltages AV[1]~AV[P] may cause the A/D converter 18 being saturated (i.e., a magnitude of an amplified sensing voltage is outside of the full conversion range of the A/D converter 18) after some of the plurality of sensing voltages V[1]~V[P] have been superposed with the environmental voltage, which decreases an accuracy of fingerprint recognition.

Figure 3:
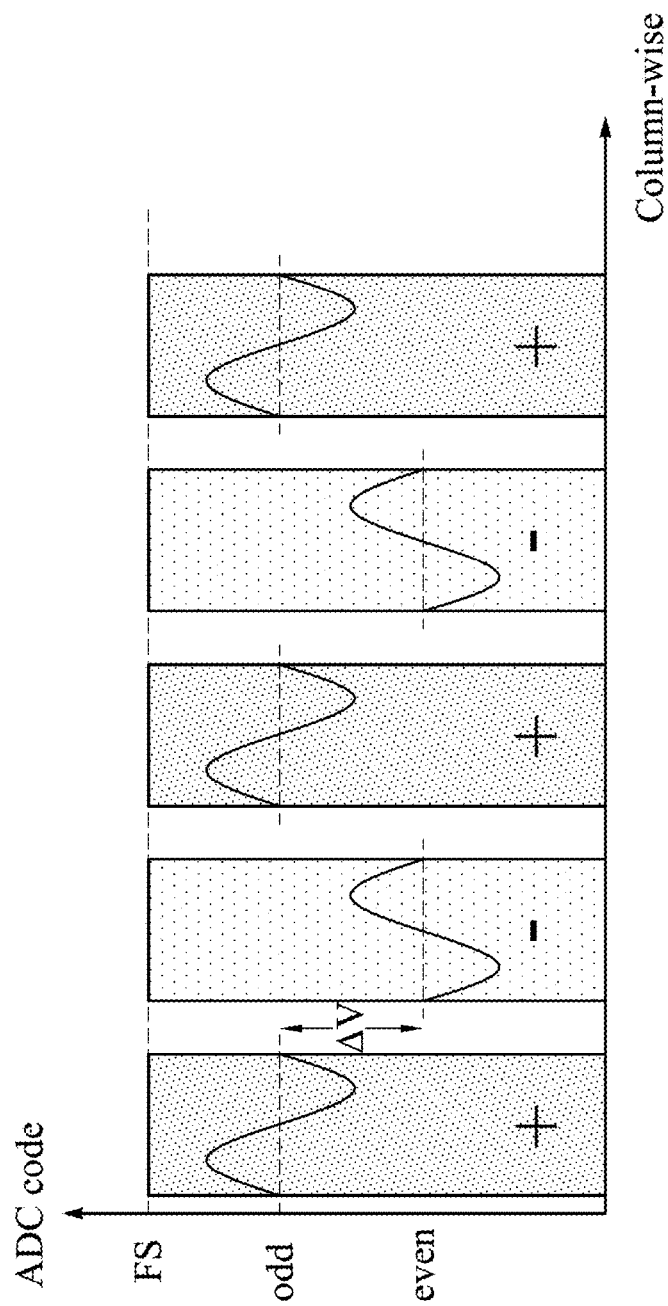
FIG. 3 is a schematic view of converted codes from the A/D converter in FIG. 1 versus columns of the display panel in FIG. 1 according to an embodiment of the present disclosure.

FIG. 3 is a schematic view of converted codes from the A/D converter 18 versus columns of the display panel 10 according to an embodiment of the present disclosure, where a maximum code value is FS (full swing). Experiments found that the converted codes of the odd-columns tend to have greater values (e.g., a pinch voltage $\Delta V$) than that of the even-columns when the liquid crystal pixels corresponding to the odd-columns are positively polarized and the liquid crystal pixels corresponding to the even-columns are negatively polarized. It should be noted that relationships between the polarity of the liquid crystal pixels and the converted codes (i.e., the averaged environmental voltages) of the fingerprint sensors could be alternated in various display panels.

Further, experiments found that the averaged environmental voltages for distinctive display panels are non-identical due to production variation. Therefore, it is difficult to choose a universal environmental voltage pattern (e.g., a universal background noise pattern) that can apply to every distinct display panel. A feasible solution is to survey the environmental voltages of every display panel by scanning each one of them, and then calculate correction voltages corresponding to the environmental voltages, in order to cancel the environmental voltages from the sensing voltages V[1]~V[P].

Figure 4:
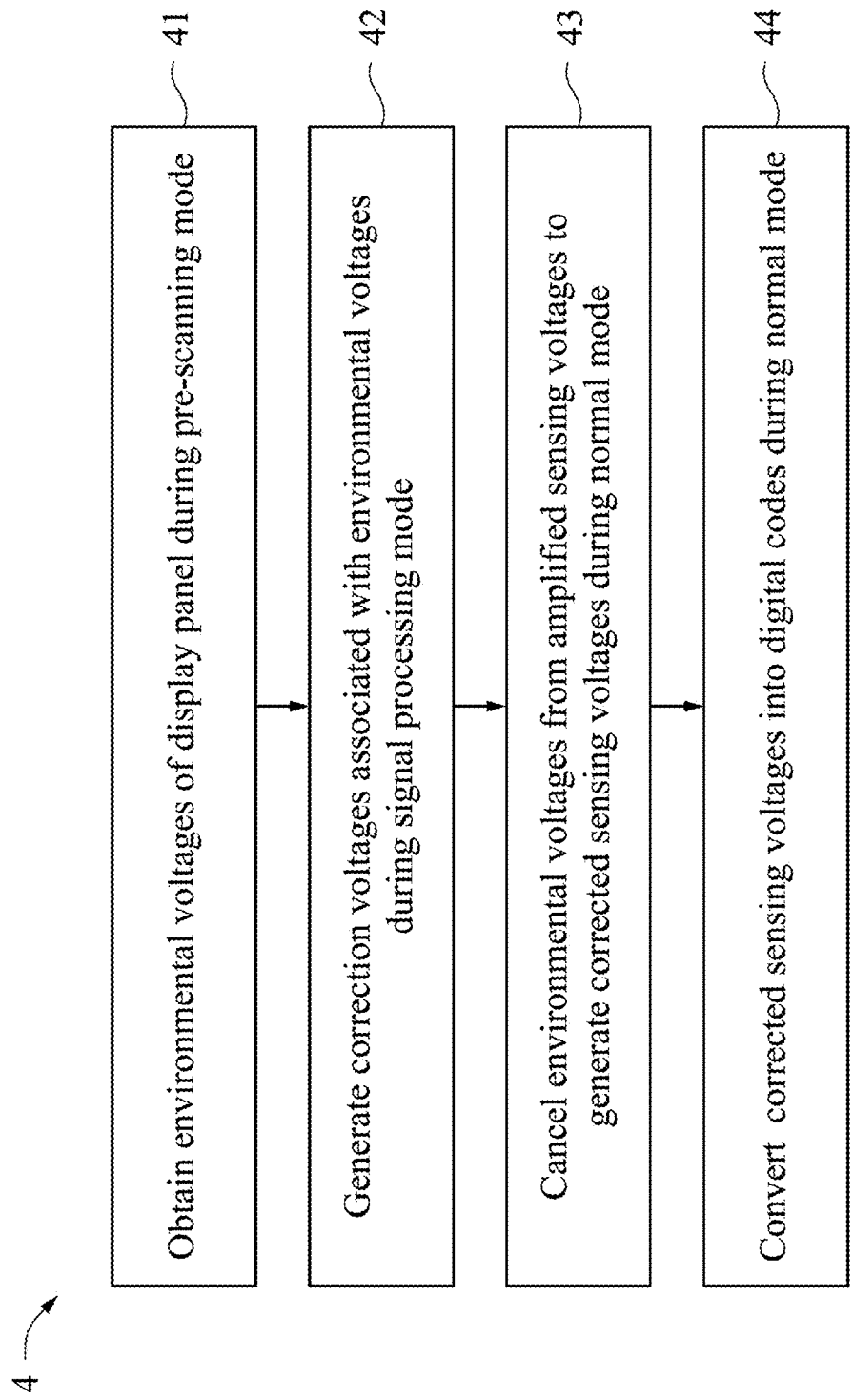
FIG. 4 is a flowchart of a correction process according to an embodiment of the present disclosure.
Figure 5:
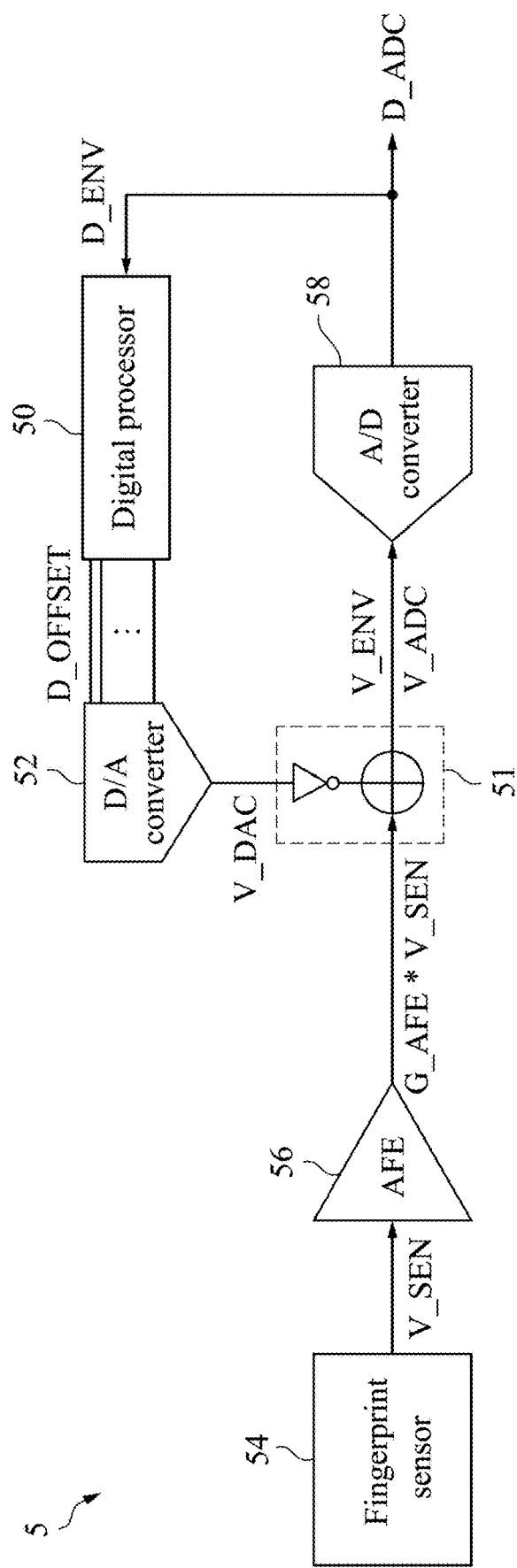
FIG. 5 is a functional block diagram of a fingerprint sensing signal correction device according to an embodiment of the present disclosure.

Reference is made to FIG. 4 and FIG. 5. FIG. 4 is a flowchart of a correction process 4 according to an embodiment of the present disclosure. FIG. 5 is a functional block diagram of a fingerprint sensing signal correction device 5 according to an embodiment of the present disclosure. The fingerprint sensing signal correction device 5 includes a digital processor 50, a substractor 51, a D/A (digital-to-analog) converter 52, at least one fingerprint sensor 54, an AFE amplifier 56 and an A/D converter 58. In one embodiment, the fingerprint sensing signal correction device 5 is configured to perform the following steps.

Step 41: Obtain a plurality of environmental voltages corresponding to a polarity distribution of a display panel during a pre-scanning mode.

Step 42: Generate a plurality of correction voltages associated with the plurality of environmental voltages during a signal processing mode.

Step 43: Feed the plurality of correction voltages into an AFE amplifier to cancel the plurality of environmental voltages from a plurality of amplified sensing voltages to generate a plurality of corrected sensing voltages during a normal mode.

Step 44: Convert corrected sensing voltages into a plurality of digital codes during the normal mode.

In step 41, the fingerprint sensing signal correction device 5 is configured to obtain a plurality of environmental voltages V_ENV of a display panel (e.g., the display panel 10 in FIG. 1) during a pre-scanning mode. Specifically, during the pre-scanning mode, the fingerprint sensor 54 is coupled to the AFE amplifier 56, and configured to generate a sensing voltage V_SEN. The AFE amplifier 56 is coupled to the fingerprint sensor 54 and A/D converter 58 via the subtractor 51, and configured to amplify the sensing voltage V_SEN by a gain G_AFE to generate the environmental voltage V_ENV, where V_ENV=G_AFE*V_SEN. The A/D converter 58 is coupled to the digital processor 50, and configured to convert the environmental voltage V_ENV into an environmental code D_ENV.

In one embodiment, during the pre-scanning mode, at least one designated zone for fingerprint sensing may be scanned from the M*N zones of the display panel 10 as shown in FIG. 1. Therefore, only the environmental code D_ENV associated with the at least one designated zone and column location thereof should be stored in a memory circuit (not shown in FIG. 5) of the digital processor 50, such that an area of the digital processor 50 can be minimized and a period for the pre-scanning mode can be shorten as much as possible.

In step 42, the fingerprint sensing signal correction device 5 is configured to generate a plurality of correction voltages associated with the plurality of environmental voltages. Specifically, during the signal processing mode, the digital processor 50 is coupled to the A/D converter 58 and the D/A converter 52, and configured to calculate an offset code D_OFFSET according to the environmental code D_ENV and data including a display zone and a column location corresponding to the environmental code D_ENV. The D/A converter is coupled to the digital processor 50 and the subtractor 51, and configured to convert the offset code D_OFFSET into a correction voltage V_DAC associated with the environmental voltage V_ENV.

In step 43, the fingerprint sensing signal correction device 5 is configured to feed the correction voltage V_DAC into the AFE amplifier 56 to cancel the environmental voltage V_ENV from an amplified sensing voltage G_AFE*V_SEN to generate a corrected sensing voltage V_ADC during the normal mode. Specifically, the D/A converter 52 is coupled to the digital processor 50 and the subtractor 51, and configured to convert the offset code D_OFFSET into the correction voltage V_DAC. The subtractor 51 is coupled to the D/A converter 52, the AFE amplifier 56 and the A/D converter 58, and configured to subtract the environmental voltage V_ENV from the amplified sensing voltage G_AFE*V_SEN, so as to generate the corrected sensing voltage V_ADC during the normal mode, where V_ADC=G_AFE*V_SEN−V_DAC. The subtractor 51 includes an inverter and an adder, in which the inverter is configured to generate an inverted correction voltage (i.e., −V_DAC) corresponding to the correction voltage V_DAC, and the adder is configured to sum the amplified sensing voltage G_AFE*VSEN and the inverted correction voltage (i.e., −V_DAC).

In step 44, the fingerprint sensing signal correction device 5 is configured to convert the corrected sensing voltage V_ADC into a corrected digital code D_ADC during the normal mode. Specifically, the A/D converter 58 is coupled to the subtractor 51 and the digital processor 50, and configured to convert the corrected sensing voltage V_ADC into the corrected digital code D_ADC during the normal mode.

By performing the correction process 4 by the fingerprint sensing signal correction device 5 of the present disclosure, the environmental voltage of every display panel can be surveyed during the pre-scanning mode and the signal processing mode, and be canceled the during normal mode, such that clean and clear registered and inputted fingerprints can be obtained by the fingerprint sensing signal correction device 5 of the present disclosure.

Figure 6:
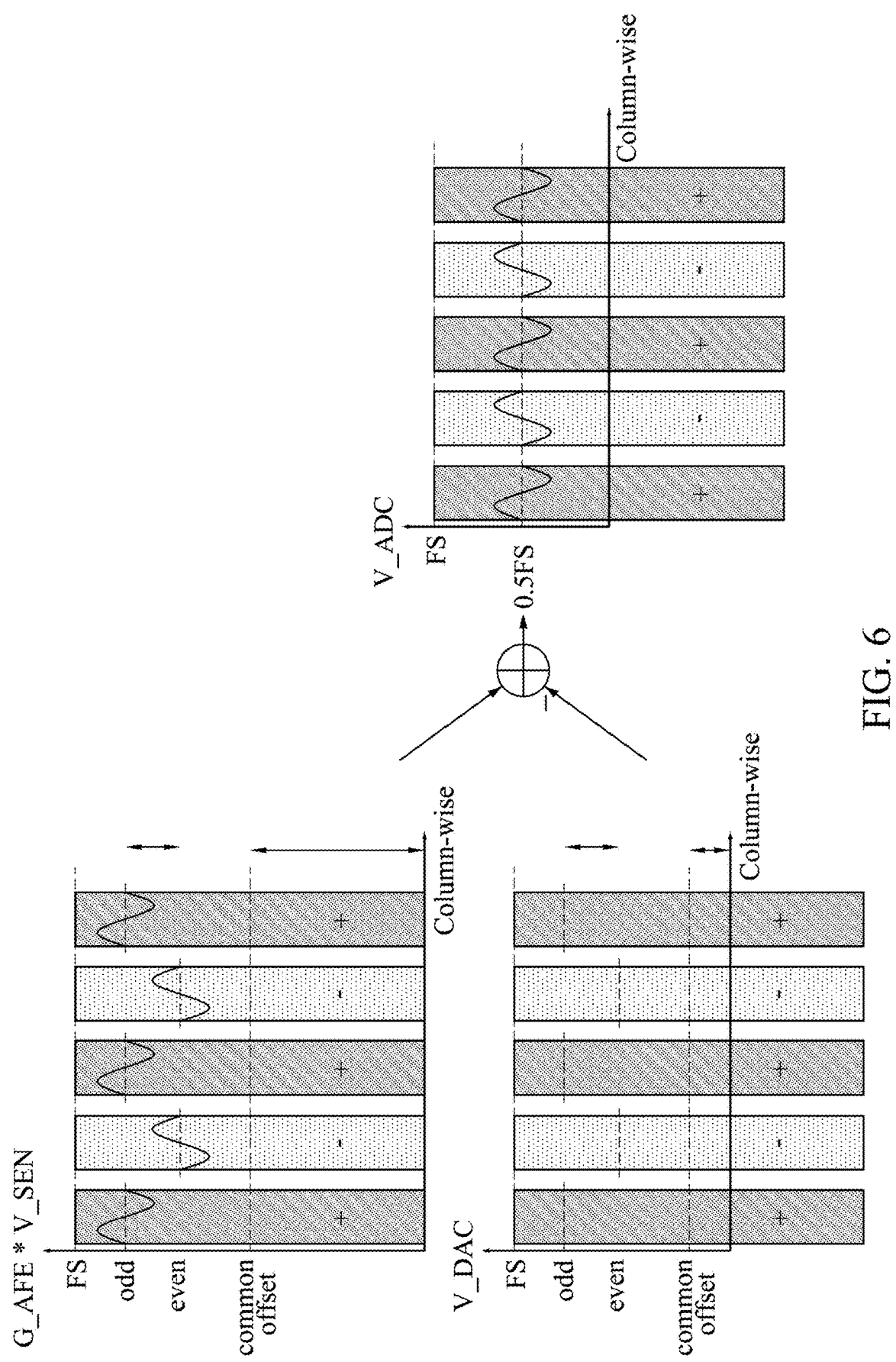
FIG. 6 is a schematic view of generating the corrected sensing voltage according to an embodiment of the present disclosure.

FIG. 6 is a schematic view of generating the correction voltage V_DAC according to an embodiment of the present disclosure. The correction voltage V_DAC is generated according to a common offset and a plurality of column-wised pinch offsets. Specifically, the digital processor 50 is further configured to calculate an averaged environmental voltage of a sensing area (e.g., the sensing area RA or UA in FIG. 1) to generate the common offset. Then, the digital processor 50 is further configured to calculate a plurality of averaged environmental voltages of columns among the sensing area to generate the plurality of column-wised pinch offsets.

In one embodiment, the A/D converter 58 in FIG. 5 has a conversion range from a maximum voltage to a minimum voltage, and an offset range between the correction voltage and the environmental voltage is either from the maximum voltage to a middle voltage of the conversion range or from the middle voltage to the minimum voltage. Specifically, the offset range between the correction voltage V_DAC and the environmental voltage V_ENV is from the maximum voltage to the middle voltage when the environmental voltage V_ENV is greater than the middle voltage. Also, the offset range between the correction voltage V_DAC and the environmental voltage V_ENV is from the middle voltage to the minimum when the environmental voltage V_ENV is not greater than the middle voltage.

Taking the embodiment of FIG. 2 and a 12-bit D/A converter having a FS (full swing) from a maximum voltage corresponding to code 4095 to a minimum voltage corresponding to code 0 as an example. An averaged environmental voltage of 113-th odd-column is converted into code 3163, and an averaged environmental voltage of 114-th even-column is converted into code 2264. A middle voltage of the conversion range corresponds to code 2047. A common offset is calculated by (3163+2264)/2−4095/2=666, an odd-column pinch offset is calculated by 3163−2047−666=450, and an even-column pinch offset is calculated by 2264−2047−666=−449. Therefore, by canceling the amplified sensing voltage G_AFE*V_SEN from the correction voltage V_DAC, the corrected sensing voltage V_ADC at the middle of the full swing (i.e., 0.5FS=code 2047) of the 12-bit D/A converter can be obtained. For example, the corrected sensing voltage V_ADC at the 113-th odd-column after cancelation can be converted into the code 3163−(450+666)=2047, and the corrected sensing voltage V_ADC at the 114-th even-column after cancelation can be converted into the code 2264−(−449+666)=2047. Since the corrected sensing voltage V_ADC is at the middle of the full swing, a maximum dynamic range for fingerprint sensing can be met.

Figure 7:
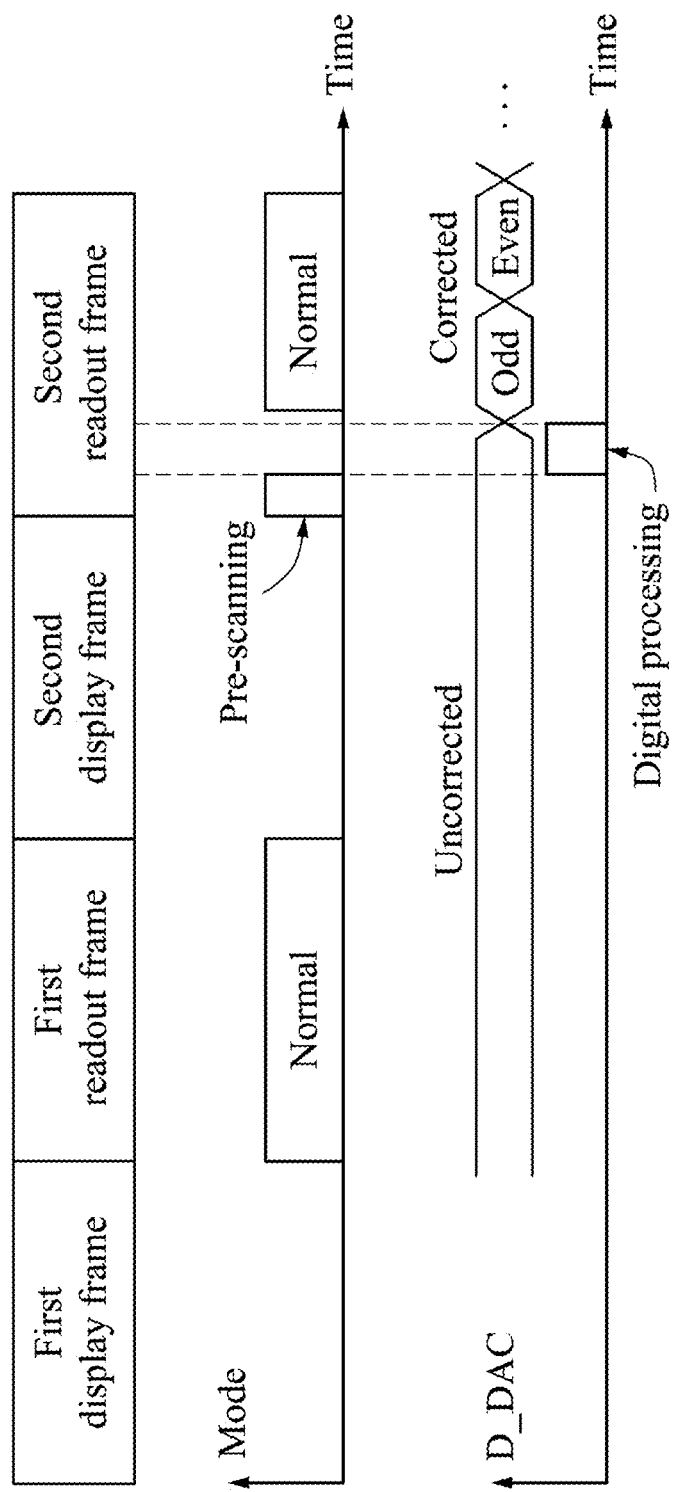
FIG. 7 is a schematic timing slot of the fingerprint sensing signal correction device in FIG. 5 cooperating with the display panel in FIG. 1 according to an embodiment of the present disclosure.

FIG. 7 is a schematic timing slot of the fingerprint sensing signal correction device 5 in FIG. 5 cooperating with the display panel 10 in FIG. 1 according to an embodiment of the present disclosure. When fingerprint sensing has not enabled yet, the display panel 10 displays a first display frame, and the fingerprint sensing signal correction device 5 does not generate any corrected digital code D_ADC. When fingerprint sensing has been enabled during a first readout frame, the fingerprint sensing signal correction device 5 operates in a normal mode and performs fingerprint sensing to generate uncorrected digital codes. During a second display frame, the fingerprint sensing signal correction device 5 keeps generating uncorrected digital codes. During a second readout frame, the fingerprint sensing signal correction device 5 operates in a pre-scanning mode to survey an environmental voltage pattern (e.g., a background noise pattern) of the display panel 10, then operates in a digital processing mode to compute correction voltages corresponding to the environmental voltages, and operates in the normal mode to perform fingerprint sensing to generate corrected digital codes according to the correction voltages. In one embodiment, the fingerprint sensing signal correction device 5 senses a fingerprint from column to column among at least one zone of the display panel 10; in another embodiment, the fingerprint sensing signal correction device 5 senses a fingerprint from row to row among at least one zone of the display panel 10.

Figure 8:
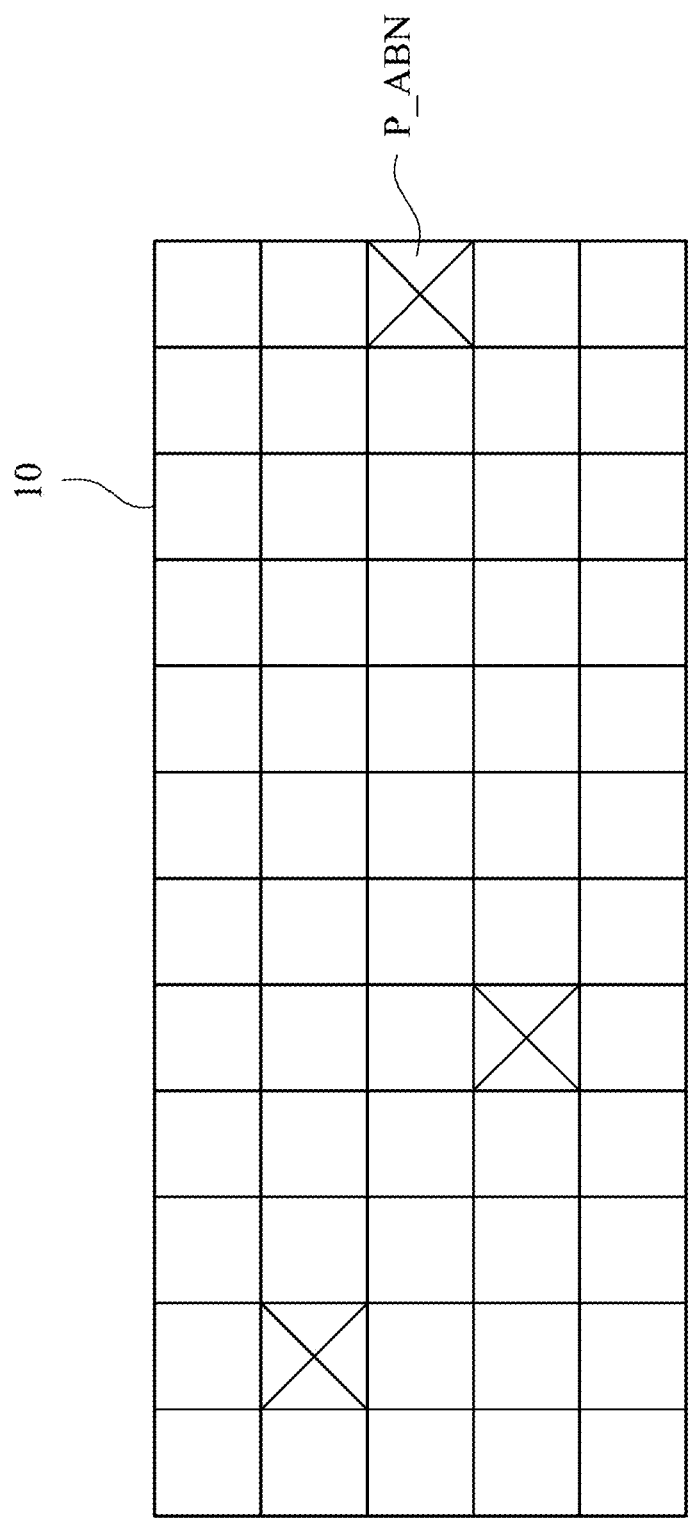
FIG. 8 is a schematic view of the display panel in FIG. 1 having at least one abnormal pixel according to an embodiment of the present invention.

FIG. 8 is a schematic view of the display panel 10 having at least one abnormal pixel P_ABN according to an embodiment of the present invention. Due to production variation, there might be at least one abnormal pixel P_ABN in the display panel 10. During the pre-scanning mode, the abnormal pixel P_ABN can be detected according to their converted code (e.g., the environmental code D_ENV in FIG. 5). In one embodiment, the digital processor is further configured to detect at least one abnormal pixel P_ABN by determining whether or not the environmental code is outside of a pre-determine range. The abnormal pixel P_ABN is detected if the environmental voltage V_ENV (or the environmental code D_ENV) is outside of the pre-determine range; and a normal pixel is detected if the environmental V_ENV (or the environmental code D_ENV) is inside of the pre-determine range. By excluding an environmental voltage of the abnormal pixel P_ABN from calculating an averaged environmental voltage of a column, the common offset and the column-wised pinch offset can be calculated correctly, which prevents the A/D converter 58 in FIG. 5 from being saturated due to the abnormal pixel P_ABN.

To sum up, the present disclosure surveys an environmental voltage pattern of a display panel, and then computes a correction voltage pattern associated with the environmental voltage pattern, in order to cancel the environmental voltage pattern from fingerprint sensing signals, such that clean and clear registered and inputted fingerprints can be obtained.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fingerprint sensing signal correction method for a fingerprint sensing signal correction device including a plurality of fingerprint sensors integrated inside of a display panel of an electronic device, comprising:
    obtaining a plurality of environmental voltages corresponding to a polarity distribution of the display panel during a pre-scanning mode, wherein the plurality of environmental voltages are induced by voltages applied to the display panel;
    generating a plurality of correction voltages associated with the plurality of environmental voltages during a signal processing mode; and
    canceling the plurality of environmental voltages from a plurality of amplified sensing voltages to generate a plurality of corrected sensing voltages during a normal mode,
    wherein the fingerprint sensing signal correction device comprises an analog-to-digital converter having a conversion range from a maximum voltage to a minimum voltage, and an offset range between the plurality of correction voltages and the plurality of environmental voltages is either from the maximum voltage to a middle voltage of the conversion range or from the middle voltage to the minimum voltage.

2. The fingerprint sensing signal correction method of claim 1, further comprising:
    obtaining a plurality of sensing voltages during the normal mode;
    amplifying the plurality of sensing voltages by a gain to generate the plurality of amplified sensing voltages.

3. The fingerprint sensing signal correction method of claim 1, wherein the display panel is divided into a plurality of zones, the step of obtaining a plurality of environmental voltages of the display panel during the pre-scanning mode comprises:
    scanning at least one designated zone from the plurality of zones of the display panel; and
    obtaining the plurality of environmental voltages of the at least one designated zone during the pre-scanning mode.

4. The fingerprint sensing signal correction method of claim 1, wherein the step of generating the plurality of correction voltages associated with the plurality of environmental voltages during the signal processing mode comprises:
    calculating an averaged environmental voltage of a sensing area of the display panel to generate a common offset;
    calculating a plurality of averaged environmental voltages of columns among the sensing area to generate a plurality of column-wised pinch offsets; and
    generating the plurality of correction voltages according to the common offset and the plurality of column-wised pinch offsets.

5. The fingerprint sensing signal correction method of claim 4, wherein the step of calculating the averaged environmental voltage of the sensing area of the display panel to generate the common offset comprises:
    detecting at least one abnormal pixel by determining whether or not at least one of the plurality of environmental voltages is outside of a pre-determine range;
    wherein the at least one abnormal pixel is detected if the at least one of the plurality of environmental voltages is outside of the pre-determine range; and a normal pixel is detected if the at least one of the plurality of environmental voltages is inside of the pre-determine range.

6. The fingerprint sensing signal correction method of claim 1, wherein the offset range between one of the plurality of correction voltages and one of the plurality of environmental voltages is from the maximum voltage to the middle voltage when the one of the plurality of environmental voltages is greater than the middle voltage, the offset range between one of the plurality of correction voltages and one of the plurality of environmental voltages is from the middle voltage to the minimum when the one of the plurality of environmental voltages is not greater than the middle voltage.

7. A fingerprint sensing signal correction device for an electronic device including a display panel and a fingerprint sensor integrated inside of the display panel, the fingerprint sensor being configured to generate a sensing voltage, the fingerprint sensing signal correction device comprising:
    an AFE (analog front-end) amplifier configured to amplify the sensing voltage by a gain to generate an environmental voltage of the display panel during a pre-scanning mode;
    an A/D (analog-to-digital) converter coupled to the AFE amplifier, and configured to convert the environmental voltage into an environmental code during the pre-scanning mode;
    a digital processor coupled to the A/D converter, and configured to calculate an offset code according to the environmental code and data including a display zone and a column location corresponding to the environmental code during a signal processing mode;

a D/A (digital-to-analog) converter coupled to the digital processor, and configured to convert the offset code into a correction voltage associated with the environmental voltage during a normal mode; and a subtractor coupled to the AFE amplifier, the A/D converter and the D/A converter, and configured to subtract the environmental voltage from the amplified sensing voltage, so as to generate a corrected sensing voltage during the normal mode.

8. The fingerprint sensing signal correction device of claim 7, wherein the fingerprint sensor is further configured to generate a sensing voltage during the normal mode; and the AFE amplifier is further configured to amplify the sensing voltage by the gain to generate the amplified sensing voltage.

9. The fingerprint sensing signal correction device of claim 7, wherein the display panel is divided into a plurality of zones, the fingerprint sensor is further configured to scan at least one designated zone from the plurality of zones of the display panel to generate the environmental voltage of the at least one designated zone during the pre-scanning mode.

10. The fingerprint sensing signal correction device of claim 7, wherein the digital processor is further configured to:

calculate an averaged environmental voltage of a sensing area of the display panel;

generate a common offset and calculate an averaged environmental voltage of a column among the sensing area to generate a column-wised pinch offset; and generate the correction voltage according to the common offset and the column-wised pinch offset.

11. The fingerprint sensing signal correction device of claim 7, wherein the digital processor is further configured to:

detect an abnormal pixel by determining whether or not the environmental voltage is outside of a pre-determine range;

wherein the abnormal pixel is detected if the environmental voltages is outside of the pre-determine range; and a normal pixel is detected if the environmental voltage is inside of the pre-determine range.

12. The fingerprint sensing signal correction device of claim 7, wherein the A/D converter has a conversion range from a maximum voltage to a minimum voltage, and an offset range between the correction voltage and the environmental voltage is either from the maximum voltage to a middle voltage of the conversion range or from the middle voltage to the minimum voltage.

13. The fingerprint sensing signal correction device of claim 12, wherein the offset range between the correction voltage and the environmental voltage is from the maximum voltage to the middle voltage when the environmental voltage is greater than the middle voltage, while the offset range between the correction voltage and the environmental voltage is from the middle voltage to the minimum voltage when the environmental voltage is not greater than the middle voltage.

* * * * *